US011831251B2

(12) United States Patent
Aeloiza et al.

(10) Patent No.: US 11,831,251 B2
(45) Date of Patent: Nov. 28, 2023

(54) VOLTAGE RATE-OF-CHANGE CONTROL FOR WIDE-BANDGAP-BASED INVERTER CIRCUITS FOR DRIVING ELECTRIC MOTORS

(71) Applicant: ABB Schweiz AG, Baden (CH)

(72) Inventors: Eddy C. Aeloiza, Apex, NC (US); Sayan Acharya, Schenectady, NY (US); Utkarsh Raheja, Raleigh, NC (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/541,784

(22) Filed: Dec. 3, 2021

(65) Prior Publication Data

US 2023/0179119 A1 Jun. 8, 2023

(51) Int. Cl.
*H02M 7/5387* (2007.01)
*H02P 27/06* (2006.01)

(52) U.S. Cl.
CPC ........ *H02M 7/53875* (2013.01); *H02P 27/06* (2013.01)

(58) Field of Classification Search
CPC ........ H02P 27/02; H02P 27/024; H02P 27/04; H02P 27/048; H02P 27/06; H02P 27/08; H02P 27/12; H02M 7/53875; H02M 7/53876; H02M 7/53878; H02M 7/5388; H02M 7/5395; H02M 7/5387; H02M 7/53871; H02M 7/53873; H02M 7/5381

See application file for complete search history.

(56) References Cited

U.S. PATENT DOCUMENTS

| 6,340,851 B1 * | 1/2002 | Rinaldi ............ H02P 27/16 307/82 |
| 9,007,102 B2 | 4/2015 | Lobsiger et al. |
| 9,048,831 B2 | 6/2015 | Wagoner et al. |

(Continued)

OTHER PUBLICATIONS

Li et al., "Simple Control Strategies for dv/dt Reduction in SiC MOSFET based Modular Multilevel Converters," abstract, *2019 IEEE 7th Workshop on Wide Bandgap Power Devices and Applications (WiPDA)*, 1 p. (Oct. 29-31, 2019).

(Continued)

*Primary Examiner* — Nguyen Tran
(74) *Attorney, Agent, or Firm* — Leydig, Voit & Mayer, Ltd.

(57) ABSTRACT

An insulated gate field effect transistor (IGFET) based converter circuit is described that includes a direct current input comprising a high voltage input and a low voltage input, an IGFET gate input, and an equivalent phase leg comprising a plurality of parallel-connected cells. The parallel-connected cells each include: a first wide bandgap IGFET having a first drain electrode connected to the high voltage input, a first gate electrode connected to a first gate control input, and a first source electrode; a second wide bandgap IGFET having a second drain electrode connected to the first source electrode, a second gate electrode connected to a second gate control input, and a second source electrode connected to the low voltage input; and a step-inducing inductor coupled to: the first source electrode of the first wide bandgap IGFET, and an output node. The step-inducing inductor is connected to the output node.

13 Claims, 3 Drawing Sheets

(56) References Cited

U.S. PATENT DOCUMENTS

| | | |
|---|---|---|
| 9,531,378 B1 | 12/2016 | Shin et al. |
| 10,425,075 B1 | 9/2019 | Consoer et al. |
| 10,461,732 B1 | 10/2019 | Norling et al. |
| 2010/0141041 A1* | 6/2010 | Bose .................. H02J 3/381 |
| | | 307/82 |
| 2019/0214932 A1* | 7/2019 | Barrass .................. B60L 58/22 |

OTHER PUBLICATIONS

Shimomura et al., "High speed dV/dt control technology for SiC power module for EV/HEV inverters," abstract, *2017 IEEE Energy Conversion Congross and Exposition (ECCE)*, 1 p. (Oct. 1-5, 2017).

Sun et al., "Active dv/dt control of 600V GaN transistors," abstract, *2016 IEEE Energy Conversion Congress and Exposition (ECCE)*, 1 p. (Sep. 18-22, 2016).

\* cited by examiner

VOLTAGE RATE-OF-CHANGE CONTROL FOR WIDE-BANDGAP-BASED INVERTER CIRCUITS FOR DRIVING ELECTRIC MOTORS

TECHNICAL FIELD

The present disclosure relates to electric motor inverter systems, and more particularly, to inverter systems utilizing wide bandgap insulated gate field effect transistors to drive an electric motor in an electrically powered motor vehicle.

BACKGROUND

Wide-bandgap devices (SiC or GaN insulated gate field effect transistors (IGFETs) also referred to as metal oxide semiconductor field effect transistors (MOSFETs)) having relatively large bandgaps of 2-4 electronvolts (eV), are a promising semiconductor technology for use in electric motor drives. Notably, such devices are able to operate at significantly higher voltage, frequency and temperatures than conventional (silicon) semiconductor technology. Additionally, wide-bandgap devices have significantly higher critical electrical field density. The die size, in turn, can be significantly smaller than comparable Si devices that leads to designs with lower parasitic capacitance and lower switching losses. The combination of these characteristics enables wide-bandgap devices to operate at much higher voltage, current, switching speed and operating frequency. As such, these devices are particularly useful for high-voltage power conversion applications, such as high-voltage inverters used in motor drives.

The aforementioned operational enhancements enable high speed switching (e.g., within a few tens of nanoseconds) where, in the case of high voltage applications (e.g., DC input voltage exceeding 600 volts), voltage rate of change exceeds 100 V/ns. The high rate of change during voltage level transitions can lead to a number of operational challenges when connected to an electric motor. In the case of a motor-drive, the high voltage transient signals can necessitate incorporation of high-frequency filters at the (alternating current, A/C) output of a power inverter circuit, leading to higher costs for the inverter component of an electrical motor-drive device. In addition, the high dV/dt voltage profile of the inverter generates currents in the motor's bearings causing progressive pitting of the bearing's race and eventually severe damage.

Additionally, high voltage rate of change in grid-connected inverters can lead to current spikes to pass through the parasitic capacitance of a filter inductor during inverter switching. The spikes, in turn, can lead to increased power loss and higher junction temperature swings—based upon the characteristics and operation of an attached load during operation. The current spikes can therefore lead to a lower expected lifetime, reliability and operating costs for the power supply containing the grid-connected inverters.

Yet another technical challenge arising from high voltage rate of change is the appearance of common mode currents (or ground currents) and the electromagnetic interference (EMI) compliance of the overall inverter system. Such compliance may require incorporation of EMI filtering circuitry that further increases the cost, complexity, size of the power supply.

SUMMARY OF THE DISCLOSURE

The disclosure herein is directed to an insulated gate field effect transistor (IGFET) based converter circuit including a direct current input comprising a high voltage input and a low voltage input, an IGFET gate input, and an equivalent phase leg comprising a plurality of parallel-connected cells. Each one of the plurality of parallel-connected cells includes: a first wide bandgap IGFET having a first drain electrode connected to the high voltage input, a first gate electrode connected to a first gate control input, and a first source electrode; a second wide bandgap IGFET having a second drain electrode connected to the first source electrode, a second gate electrode connected to a second gate control input, and a second source electrode connected to the low voltage input; and a step-inducing inductor coupled to: the first source electrode of the first wide bandgap IGFET, and an output node. The step-inducing inductor of each one of the plurality of parallel-connected cells is connected to the output node.

Further and alternative aspects and features of the disclosed principles will be appreciated from the following detailed description and the accompanying drawings. As will be appreciated, the principles related to systems, methods, and software for apparatuses and operation thereof disclosed herein are capable of being carried out in other and different embodiments, and capable of being modified in various respects. Accordingly, it is to be understood that both the foregoing general description and the following detailed description are exemplary and explanatory only and do not restrict the scope of the appended claims.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION

Reference will now be made in detail to specific embodiments or features, examples of which are illustrated in the accompanying drawings. Wherever possible, corresponding or similar reference numbers will be used throughout the drawings to refer to the same or corresponding parts. Moreover, references to various elements described herein, are made collectively or individually when there may be more than one element of the same type. However, such references are merely exemplary in nature. It may be noted that any reference to elements in the singular may also be construed to relate to the plural and vice-versa without limiting the scope of the disclosure to the exact number or type of such elements unless set forth explicitly in the appended claims.

In accordance with the current disclosure, an equivalent phase leg electrical circuit (comprising multiple, parallel-connected, cells provided in place of a single cell for each phase leg) is disclosed as well as a method for controlling flow through individual cells of the equivalent phase leg to reduce an average voltage change rate in an inverter circuit that converts an input direct current into an alternating output for use, by way of example, to drive one or more electric motors in an pump, fan, conveyor, etc. The proposed electrical circuit and method of controlling current flow through WBG-IGFETs (also referred to as WBG-MOSFETs) thereof achieve reduced voltage change rate without significant increases to the complexity of the control circuitry providing gate control signals to the individual gates of the cells within the equivalent phase leg electrical circuit and without significantly increasing power loss within the phase leg of the inverter.

Figure 1:
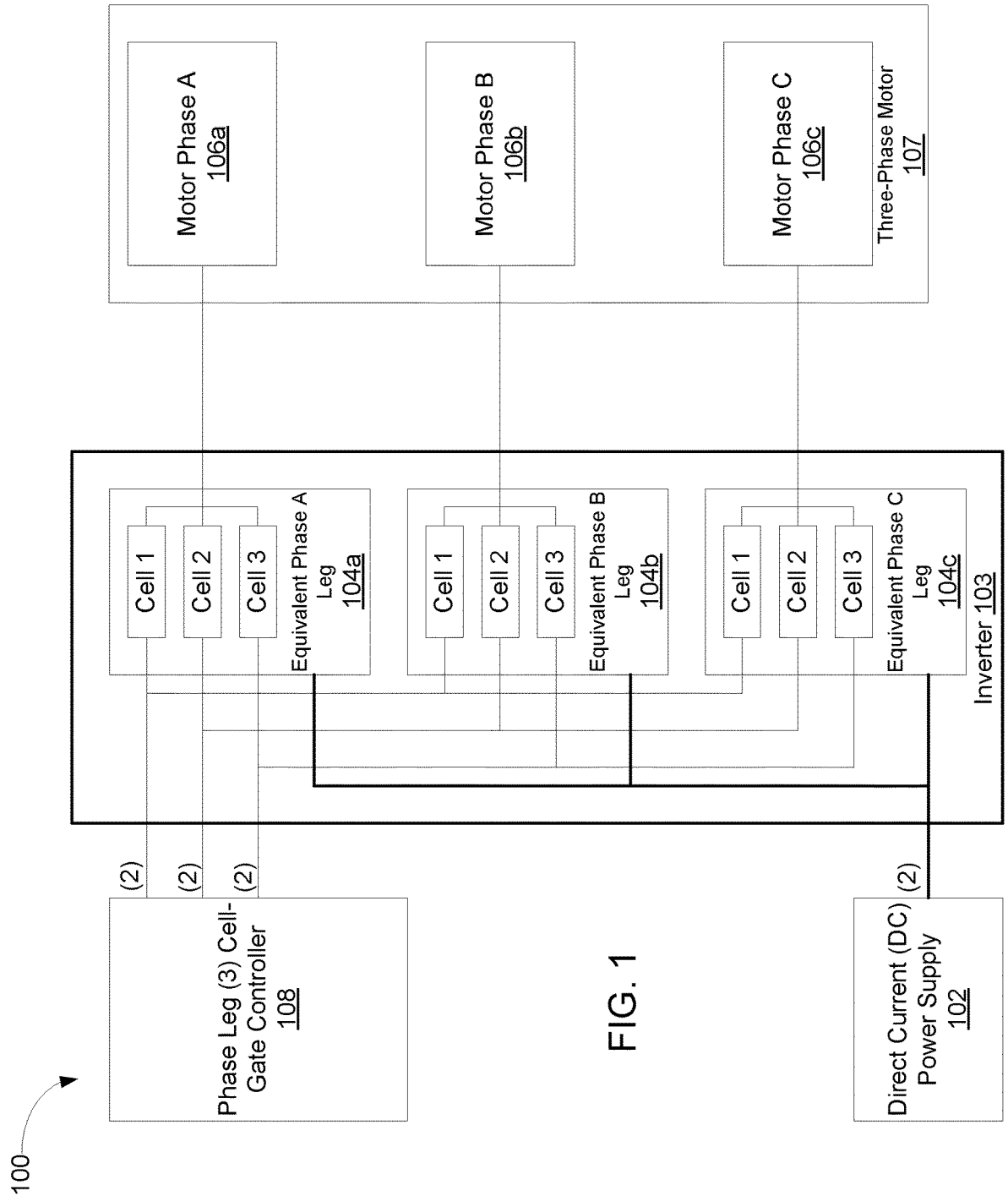
FIG. 1 is a functional schematic outline drawing of a motor in accordance with the disclosure.

Turning to FIG. 1, a schematic drawing is provided of an exemplary electrical motor system 100. The motor system includes a DC power source 102. The output of the DC power source 102 provides a high voltage (e.g. 600 volts) power rail that supplies DC power to an inverter 103 comprising a plurality of equivalent phase legs 104a, 104b, 104c (in the case of a three-phase electrical motor). Each one of the plurality of equivalent phase legs 104a, 104b and 104c provides an AC power supply to a corresponding one of a plurality of motor phases 106a, 106b and 106c (of a three phase electric motor 107).

A phase leg cell-gate controller 108 comprises a set of gate drive signal lines that supply a gate control signal, on an individual cell basis, to respective cells within each of the equivalent phase legs 104a, 104b and 104c. In the illustrative example, where each equivalent phase leg 104 includes three parallel-connected cells (1, 2 and 3) for providing an alternating current to a connected phase of the three phase electric motor 107, the phase leg cell-gate controller 108 provides three control output signals to corresponding ones of the cells (1, 2 and 3) of the equivalent phase legs 104a, 104b and 104c.

Figure 2:
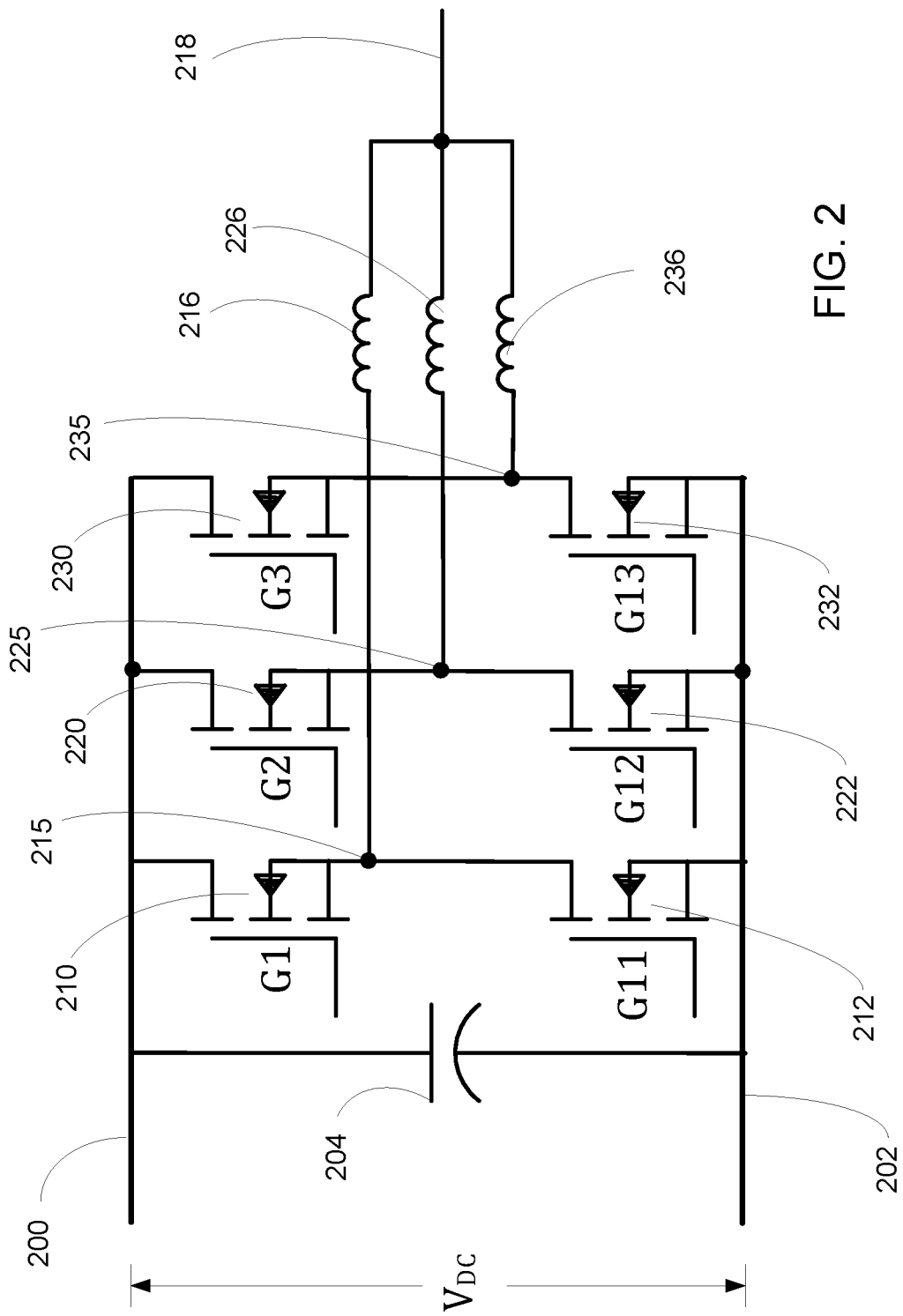
FIG. 2 is an equivalent electrical circuit diagram for a single phase of a power inverter coupled to a corresponding phase load of a motor in accordance with an illustrative example in accordance with the disclosure.

Turning to FIG. 2, an electrical schematic diagram is provided for an exemplary one of the equivalent phase legs 104a, 104b, and 104c, depicted in FIG. 1. In general, each of the equivalent phase legs comprise three cells, with each cell being coupled, at an output, to a common inductive load (e.g. electric motor phase winding) at an output 218. With specific reference to FIG. 2, the equivalent phase leg receives DC power (Vdc) via a high voltage line 200 and a low voltage line 202. A first capacitor bank 204 is connected between the high voltage line 200 and the low voltage line 202.

For a first cell, of three parallel-connected cells making up the exemplary equivalent phase leg, a first IGFET 210 (an enhancement mode n-channel wide bandgap IGFET) has a drain electrode connected to the high voltage line 200 and a source electrode connected to a drain electrode of a second IGFET 212 having a source electrode connected to the low voltage line 202. A first coupling inductor 216 is connected between an ac output 215 of a first half-bridge leg (first cell) and the output 218. The coupling inductors are sized with much lower inductance values (in relation to a load inductance at the output 218) and can have a ferromagnetic core or be coreless type. The value of the inductance first coupling inductor (as well as a second coupling inductor 226 and a third coupling inductor 236) is sufficiently low to avoid increasing the size and weight of the inverter circuit (in comparison to the equivalent single-leg inverter). For example, values of only a few micro Henries (2-10 µH) are necessary, and the size is ultimately determined by the inverter size and operating environment. In general, it is expected values of less than 0.05 in per unit (p.u.) (or 0.5%) when expressed in reference to the base impedance of the inverter. The first cell includes gate signal inputs G1 and G11 that are operated in a complementary manner. As such, when G1 is driven with a high (Von) input signal, the input signal to G11 is low (and vice-versa). See FIG. 3A described herein below.

With continued reference to FIG. 2, For a second cell, of the three parallel-connected cells making up the exemplary equivalent phase leg, a third IGFET 220 has a drain electrode connected to the high voltage line 200 and a source electrode connected to a drain electrode of a fourth IGFET 222 having a source electrode connected to the low voltage line 202. The second coupling inductor 226 is connected between an ac output 225 of a second half-bridge leg (second cell) and the output 218.

For a third cell, of the three parallel-connected cells making up the exemplary equivalent phase leg, a fifth IGFET 230 has a drain electrode connected to the high voltage line 200 and a source electrode connected to a source electrode of a sixth IGFET 232 having a source electrode connected to the low voltage line 202. A third coupling inductor 236 is connected between an ac output 235 of a third half-bridge leg (third cell) and the output 218. It is expressly noted that the multi-cell equivalent phase leg arrangement of the inverter 103, including three cells, is exemplary in nature, and other illustrative examples may include as few as two cells in each equivalent phase leg and more than three cells in each equivalent phase legs. It is noted that fewer (i.e., two) or more (4, 5, etc.) cells/half-bridge legs may be used in alternative implementations of the illustrative three parallel-connected cells making up the equivalent phase leg depicted in FIG. 2.

Having described an exemplary circuit arrangement for equivalent phase legs 104a, 104b and 104c, attention is directed to a description of an exemplary input signal arrangement to the gate electrodes of the first IGFET 210, second IGFET 212, third IGFET 220, fourth IGFET 222, fifth IGFET 230 and sixth IGFET 232 for achieving a reduced rate of change of output voltage at the output 218 of the equivalent phase leg. In general, the signals on the cell-specific output lines from the controller 108 to the respective cell groups of the equivalent phase legs 104a, 104b and 104c are staggered by, for example, 50-200 nanoseconds. The time delays result in a step-wise, multi-inclined segment, increase in voltage at the equivalent phase leg output 218 (in three inclined-rise steps from zero to 600 volts). The voltage rise, during the voltage rise at the output 218, at each inclined step stabilizes at times r1, r2 and r3 (after t1, t2 and t3, respectively). Similar voltage drops stabilize at times r4, r5 and r6 (after t4, t5 and t6, respectively). As a consequence, the output voltage at the equivalent phase leg output 218 does not switch the entire DC bus voltage in a single transition. Instead, the output voltage transition occurs in inclined steps (in the particular example, three steps), as the controller 108 sequentially applies a high (turn on) voltage to gate electrodes of gates G1, G2 and G3 of respective first, second and third cells of each equivalent phase (A, B and C in FIG. 1). Complementary (inverted) inputs are fed to gates G11, G12 and G13. Thus, for example, when the input to G1 goes high (at t1), the complementary signal input to G11 goes low. Thereafter, at t2, G2 goes high and G12 goes low. Thereafter, at t3, G3 goes high and G13 goes low to complete the output voltage switch over a period of time that is extended by the step-wise approach depicted in FIG. 3 that includes two inserted delay periods (as opposed to a single instantaneous switch). The step-wise turn-off of the voltage at output 218 is carried out during t4, t5 and t6. The step-wise increase in output voltage at output 218 is depicted in the illustratively depicted output signal (Vout) in FIG. 3. The effect of the staggered control input signal activation (to raise/lower the voltage at output 218) is to extend the period of time over which the output voltage changes during a transition—effectively reducing an average dV/dt of the output voltage, without modifying the switching characteristics of solid-state circuitry of the switching circuits.

In general, the time delays for each step must be sufficiently short to ensure that the voltages across the coupling inductors 216, 226 and 236 (that become a short circuit after a sufficient delay) does not degrade significantly. By way of example, to the time delay is chosen in accordance with the impedance of the coupling inductors 216, 226 and 236. In principle the time delay and inductor size are chosen to limit the maximum current ripple (di) in the coupling inductor circuit during switching from low/high (and vice versa). The time delay to achieve a current ripple limit is determined (approximately) by the equation dt=L di/Vdc (where dt is the delay time between commencing the first step and the third step, L is the effective minimum inductance, and Vdc is the total voltage change). By way of example, the value of di is 10 to 25 percent of the maximum converter current.

Figure 3:
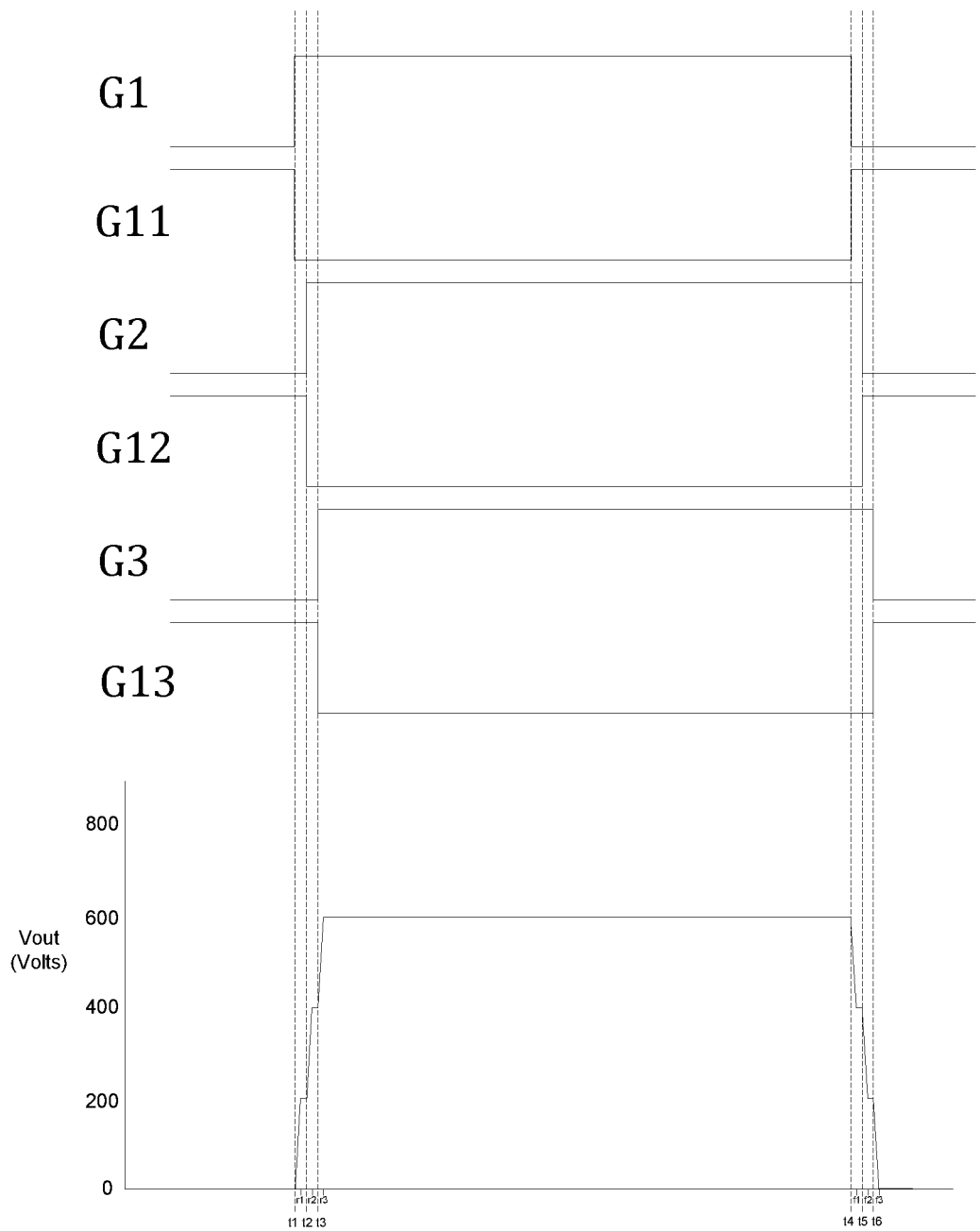
FIG. 3 is an exemplary signal timing diagram set including six input signal waveforms (corresponding to the six gates of the IGFETS depicted in FIG. 2) and a single output voltage at the load for a single switching cycle of an inverter phase driving an inductive motor phase load in accordance with the electrical schematic diagram in FIG. 2 in accordance with the disclosure.

As depicted in FIG. 3, during each delay duration (for sufficiently small time delays between t1-t2 and t2-t3 to ensure that a percentage of the voltage exceeds 75 percent), the DC bus voltage is primarily shared by the inductors 216, 226 and 236 (collectively operating as a voltage divider between the high and low voltage rails of the DC input) based upon the activation pattern of gates of the above-described equivalent phase legs 104a, 104b and 104c (see FIG. 2 described herein above). Each stepwise increase in the number of activated gates of the three parallel cell circuits (providing a path from the DC high voltage line 200 to one of the inductors 216, 226 and 236) leads to a change in current flowing through individual ones of the inductors 216, 226 and 236. Considering the relatively short delay duration, the change in the cell currents can be limited with even small values of inductors (e.g., a few uH or less), and the inductors 216, 226 and 236 need not occupy a significant amount of space of the inverter 103. By way of example, the inductors 216, 226 and 236 are provided by cables connecting ones of the cells of each equivalent phase leg.

Another aspect of the circuit and control of activation of cell groups within the disclosed inverter circuit structures includes changing an activation order of the three cell groups to ensure a fully balanced operation of each of the (three) cells within each equivalent phase leg and stresses upon circuitry thereof, and prevents introduction of a DC offset in the output over a fundamental cycle. When the activation positions are equally shared among each of the three cell groups, the average current is the same for each of the cells making up the multi-cell equivalent phase leg circuit depicted, by way of example, in FIG. 2.

Various embodiments disclosed herein are to be taken in the illustrative and explanatory sense, and should in no way be construed as limiting of the present disclosure.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. An insulated gate field effect transistor (IGFET) based converter circuit comprising:
    a direct current input comprising a high voltage input and a low voltage input;
    an IGFET gate input; and
    an equivalent phase leg comprising a plurality of parallel-connected cells,
    wherein each one of the plurality of parallel-connected cells comprises:
        a first wide bandgap IGFET having:
            a first drain electrode connected to the high voltage input,
            a first gate electrode connected to a first gate control input, and
            a first source electrode;
        a second wide bandgap IGFET having:
            a second drain electrode connected to the first source electrode,
            a second gate electrode connected to a second gate control input, and
            a second source electrode connected to the low voltage input; and
        a step-inducing inductor coupled to:
            the first source electrode of the first wide bandgap IGFET, and an output node, and
    wherein the step-inducing inductor of each one of the plurality of parallel-connected cells is connected to the output node; and
    a gate controller providing gate input signals, on a per-cell basis, to the first gate electrode and second gate electrode, wherein the gate input signals are provided in a staggered manner to differing cells during commencement of current flow through the first wide bandgap IGFET.

2. The IGFET based converter circuit of claim 1, wherein the controller changes input sequencing to individual ones of the plurality of parallel-connected cells.

3. The IGFET based converter circuit of claim 1, wherein the converter is an inverter, and
    wherein the output node is an alternating current output node.

4. The IGFET based converter circuit of claim 3, wherein the alternating current output node, during operation of the converter, provides an alternating voltage having a range of at least about 600 volts.

5. The IGFET based converter circuit of claim 1, comprising a plurality of the equivalent phase legs, configured to drive a distinct output phase lines of a multi-phase converter, and wherein each one of the plurality of equivalent phase legs drives a distinct phase of an alternating current output.

6. The IGFET based converter circuit of claim 5, configured to drive a multi-phase electric motor.

7. The IGFET based converter circuit of claim 1, wherein the equivalent phase leg contains three parallel-connected cells.

8. The IGFET based converter circuit of claim 1, wherein the converter comprises wide-bandgap IGFET devices.

9. The IGFET based converter circuit of claim 1, further comprising a second of the plurality of parallel-connected cells, the second cell comprising:
    a third wide bandgap IGFET having:
        a third drain electrode connected to the high voltage input, a third gate electrode connected to a third gate control input, and a third source electrode;

a fourth wide bandgap IGFET having:

a fourth drain electrode connected to the third source electrode, a fourth gate electrode connected to a fourth gate control input, and a fourth source electrode connected to the low voltage input; and a second step-inducing inductor coupled to:

the third source electrode of the third wide bandgap IGFET, and the output node.

10. The IGFET based converter circuit of claim 9, wherein the gate controller provides:

a first gate input signal and a second gate input signal simultaneously to the first wide bandgap IGFET and the second wide bandgap IGFET respectively, at a first time; and a third gate input signal and a fourth gate input signal simultaneously to the third wide bandgap IGFET and the fourth wide bandgap IGFET respectively, at a second time.

11. The IGFET based converter circuit of claim 10, wherein the second time is after 50-200 nanoseconds after the first time.

12. The IGFET based converter circuit of claim 1, wherein the output node provides alternating current to a connected phase of a poly-phase motor.

13. The IGFET based converter circuit of claim 1, further comprising three equivalent phase legs, wherein each of the three equivalent phase legs provides power to a respective phase of a three-phase motor.

* * * * *